United States Patent
Gasser (10) Patent No.: US 11,235,507 B2
(45) Date of Patent: Feb. 1, 2022

(54) APPARATUS AND METHOD FOR LAMINATING A FILM PART ON A CARRIER PART, METHOD FOR LAMINATING A CARRIER PART WITH A FILM PART, METHOD FOR RETROFITTING A TOOL AS WELL AS INSTALLATION FOR PRODUCING A COMPONENT LAMINATED WITH A FILM LAYER

(71) Applicant: Persico SpA, Nembro (IT)

(72) Inventor: Andreas Gasser, Teisendorf (DE)

(73) Assignee: PERSICO SPA, Nembro BG (IT)

( * ) Notice: Subject to any disclaimer, the term of this patent is extended or adjusted under 35 U.S.C. 154(b) by 414 days.

(21) Appl. No.: 16/310,888

(22) PCT Filed: Jun. 19, 2017

(86) PCT No.: PCT/DE2017/000172
§ 371 (c)(1),
(2) Date: Dec. 18, 2018

(87) PCT Pub. No.: WO2017/220063
PCT Pub. Date: Dec. 28, 2017

(65) Prior Publication Data
US 2019/0263047 A1   Aug. 29, 2019

(30) Foreign Application Priority Data
Jun. 19, 2016   (DE) ...................... 10 2016 007 337.3

(51) Int. Cl.
*B29C 51/16* (2006.01)
*B29C 63/00* (2006.01)
(Continued)

(52) U.S. Cl.
CPC .......... *B29C 51/16* (2013.01); *B29C 63/0065* (2013.01); *B29C 63/0073* (2013.01);
(Continued)

(58) Field of Classification Search
None
See application file for complete search history.

(56) References Cited

FOREIGN PATENT DOCUMENTS

| DE | 3411023 A1 * | 9/1985 | ............ B29C 63/04 |
| DE | 9408396 U1 | 9/1994 | |

(Continued)

OTHER PUBLICATIONS

Machine translation of DE 3411023A1 (Year: 1985).*
(Continued)

*Primary Examiner* — Barbara J Musser
(74) *Attorney, Agent, or Firm* — Tarolli, Sundheim, Covell & Tummino LLP (57) ABSTRACT

The invention relates to an apparatus for laminating a film part, in particular a decorative layer, on a carrier part having a laminating region in which the film part can be laminated onto the carrier part, in particular onto a motor vehicle interior trim part, having an edge region arranged adjacent to this laminating region in which the film part projects beyond the carrier part in order to produce a bend-around region on the film part which can subsequently be bent around a carrier part edge, and having a tool in which the tool comprises a first tool half for producing a surface design on the film part and a second tool half for receiving the carrier part, wherein the first tool half comprises thermally differently acting sub-regions, namely a first sub-region with a contour for the surface design which interacts with the laminating region and a thermal sub-region which interacts with the edge region adjacent to the laminating region.

15 Claims, 2 Drawing Sheets

(51) Int. Cl.
  *B29C 63/02*  (2006.01)
  *B29C 63/04*  (2006.01)
  *B29C 51/10*  (2006.01)
  *B29C 59/02*  (2006.01)
  *B29L 31/30*  (2006.01)
  *B29C 51/26*  (2006.01)
  *B29C 51/08*  (2006.01)
  *B29K 105/04* (2006.01)
  *B29K 101/12* (2006.01)
  *B29C 51/32*  (2006.01)

(52) U.S. Cl.
  CPC ............ *B29C 63/025* (2013.01); *B29C 63/04* (2013.01); *B29C 51/082* (2013.01); *B29C 51/10* (2013.01); *B29C 51/262* (2013.01); *B29C 51/32* (2013.01); *B29C 59/02* (2013.01); *B29C 2791/006* (2013.01); *B29K 2023/06* (2013.01); *B29K 2101/12* (2013.01); *B29K 2105/04* (2013.01); *B29K 2995/0074* (2013.01); *B29L 2031/302* (2013.01); *B29L 2031/3005* (2013.01); *B29L 2031/3055* (2013.01)

(56) References Cited

FOREIGN PATENT DOCUMENTS

| | | | |
|---|---|---|---|
| DE | 102009054486 A1 * | 6/2011 | ............ B29C 63/04 |
| DE | 102015011156 A1 | 3/2016 | |
| EP | 0747201 A2 | 12/1996 | |

OTHER PUBLICATIONS

Machine translation of DE 9408396U1 (Year: 1994).*
Machine translation of 102009054486A1 (Year: 2009).*
International Search Report for corresponding international application No. PCT/DE2017/000172, dated Oct. 13, 2017.

* cited by examiner

APPARATUS AND METHOD FOR LAMINATING A FILM PART ON A CARRIER PART, METHOD FOR LAMINATING A CARRIER PART WITH A FILM PART, METHOD FOR RETROFITTING A TOOL AS WELL AS INSTALLATION FOR PRODUCING A COMPONENT LAMINATED WITH A FILM LAYER

RELATED APPLICATIONS

The present invention is a U.S. National Stage under 35 USC 371 patent application, claiming priority to Serial No. PCT/DE2017/000172, filed on 19 Jun. 2017; which claims priority of DE 10 2016 007 337.3, filed on 19 Jun. 2016, the entirety of both of which are incorporated herein by reference.

The invention relates to an apparatus for laminating a film part, in particular a decorative layer, on a carrier part having a laminating region in which the film part can be laminated onto the carrier part, in particular onto a motor vehicle interior trim part, having an edge region arranged adjacent to this laminating region in which the film part projects beyond the carrier part in order to produce a bend-around region on the film part which can subsequently be bent around a carrier part edge, and having a tool in which the tool comprises a first tool half for producing a surface design on the film part and a second tool half for receiving the carrier part.

The invention furthermore relates to an installation for producing a component laminated with a film part, in particular with a decorative layer, in particular a motor vehicle interior trim part, comprising an apparatus for laminating the film part on a carrier part and comprising an apparatus for bending round a bend-around region of the film part which projects radially beyond a carrier part edge.

The invention further relates to method for laminating a film part, in particular a decorative layer, on a carrier part by means of a tool comprising a first and second tool half in which the film part in the tool can be provided with a surface design, in which the film part is laminated onto the carrier part in a laminating region, and in which a bend-around region is produced in an edge region arranged adjacent to this laminating region, which bend-around region can subsequently be bent around a carrier part edge.

The invention additionally relates to a method for laminating a carrier part with a film part, in particular a decorative layer in a tool comprising a first tool half and comprising a second tool half, in particular for producing a motor vehicle interior trim part, wherein the decorative layer in the tool can be provided with a surface design, in particular with a surface texture, wherein the decorative layer completely covers a laminating region on the carrier part and forms a bend-around region or a run-out, in particular a film run-out, running out over a marginal edge of the laminating region.

The invention also relates to a method for retrofitting a tool for laminating a carrier part with a film part, in particular with a decorative layer, in a tool with an existing shell tool half and an existing positive tool half.

Generic apparatuses for laminating semi-finished products with a film or the like and relevant methods are already known from the prior art.

Usually it is a question here of giving a correspondingly high-quality surface to a functional component such as, for example a visually and haptically perceptive component for a consumer or customer, possibly a motor vehicle interior trim part of the like. These functional components usually consist of a seemingly lower-quality carrier part, for example, made of plastic and seemingly higher-quality coating or lamination which is connected permanently to the carrier part. By this means, these functional components can be produced relatively cost-effectively. A corresponding coating or lamination can successfully be provided by means of a film or a film part.

Furthermore it is frequently desired for functional components to be equipped with a special surface design such as a surface texture or leather surface texture or similar in order to specifically impart an impression of a leather surface with the aid of such a specially designed decorative layer. Here, so-called in-mould graining (IMG) methods are used in which IMG tools are used. Such an IMG tool has a tool half to be provided with a negative image of a surface texture or the like, which is also designated as IMG tool half or IMG shell, by means of which a corresponding surface design is introduced onto a visible A-side or good side of a film part to be laminated. For this purpose the corresponding film part is sucked onto the tool half by means of negative pressure. This can be accomplished in a correspondingly adapted tool, for example, shortly before application of the film part to the carrier part or also simultaneously during application of the film part to the carrier part, wherein the carrier part is placed in a second tool half of the tool. During such a laminating process, the film part projects laterally beyond the carrier part with its overhang in order to be subsequently "adhesively bonded" to the rear side of the carrier part after the film part has been folded around or bent around the edge of the carrier part. This overhang located in the run-out of the tool is also designated as bend-around region or bend-around flap of the film part.

It is understood that a corresponding coating or lamination must be applied with the greatest care to the carrier part in order to be able to achieve the desired high-quality overall impression. In particular, no distortions such as folds etc. should appear on the coating or lamination, which is usually always successfully achieved on the surface of a carrier part. More critical however are the edges of a carrier part on which the film part must rest the same free from distortion or free from folds on the carrier part after the laminating, since these edges are usually also visible. In order to reduce the risk of an inadequate lamination of the carrier part edge, frequently a fillet or the like is incorporated in the second tool half directly adjacent to the carrier part edge in which the bend-around region of the film part can be introduced or drawn in, in order that it can also be laminated onto the rear part of the carrier part edge. However, unsatisfactory results are obtained here again and again so that finished functional components must frequently be discarded as rejects.

DE 10 2015 011 156 A1 teaches, for example a generic "in-mould graining" lamination, IMG lamination for short, of a preferably heated film on a carrier part in order to thereby obtain a high-quality functional component.

It is the object of the present invention to further develop generic apparatuses and methods for laminating a carrier part with a film part, in order to be able to ensure in particular a higher-quality laminating result in an operationally reliable manner. Furthermore, film material should also be saved with the result that, in particular with regard to a mass product, the manufacturing costs can overall be significantly reduced.

The object of the invention is solved according to a first aspect of the invention by an apparatus for laminating a film part, in particular a decorative layer, on a carrier part having a laminating region in which the film part can be laminated onto the carrier part, in particular onto a motor vehicle interior trim part, having an edge region arranged adjacent to this laminating region in which the film part projects beyond the carrier part, in order to produce a bend-around region on the film part which can subsequently be bent around a carrier part edge, and having a tool in which the tool comprises a first tool half for producing a surface design on the film part and a second tool half for receiving the carrier part, wherein the first tool half comprises thermally differently acting sub-regions, namely a first sub-region with a contour for the surface design which interacts with the laminating region and a thermal sub-region which interacts with the edge region adjacent to the laminating region.

If the first tool half comprises thermally differently acting sub-regions, the edge region in which the film part is principally located with its bend-around region is in particular temperature-controlled to be warmer than the remainder of the film part in the laminating region.

For example, the first sub-region and the thermal sub-region can be achieved by a suitable choice of material in the apparatus, in particular on the first tool half.

In a specific embodiment of the invention, the first tool half in the laminating region can for example comprise an "IMG shell" of a nickel material whilst the edge region is prepared from a plastic or similar being thermally better insulated.

As a result of the thermal advantage obtained by this means, the bend-around region is configured to be at least temporarily more elastic than the remainder of the film part, with the result that the film part with its bend-around region can be better deformed during lamination onto the carrier part and thus can nestle more completely against the carrier part edge of the carrier part.

In particular, fewer forming forces are then required in the edge region, in order to transfer or suck in the bend-around region for example into a fillet or the like of the second tool half, so that the film part with its bend-around region overall rests more pliably as far as onto the rear region of the carrier part edge and therefore can be laminated with higher quality on the entire carrier part edge.

By this means the edge region of a functional part can be provided with a higher-quality lamination.

In an apparatus for laminating a carrier part with a film part, a film part preheated before introduction into the tool always cools down to some degree on contact with said tool, in particular on contact with a tool half of the tool during imprinting of a surface design into the film part, as during an IMG lamination. Hitherto this has again and again resulted in incorrect laminations in critical regions in the carrier part edge. In particular, frequently only an adequate front edge lamination takes place, that is, the carrier part edge is only sufficiently well laminated in its front region facing the good side of the functional component to be produced. This can in turn result in considerable problems at a downstream bending-round device in which the bend-around region is completely bent around the carrier edge.

It was identified in the present case that a prevention of a critical cooling of the film part especially in the bend-around region is already sufficient to achieve on the one hand an exceptionally good rear edge lamination of the carrier part edge.

On the other hand, it is achieved in the present case that the bend-around region can be introduced or sucked in operationally reliably into the fillet provided on the second tool half, whereby the risk that the bend-around region is not specifically completely drawn into the fillet, which in turn results in a shortened bend-around region which can be permanently connected to the rear side of the carrier part, can be eliminated or at least significantly reduced.

In particular as a result of thermal tolerances, different lengths can be available with regard to the available bend-around region, with the result that possibly the fillet in the second tool half must be re-milled. This is not only time-consuming but also makes manufacturing considerably more expensive.

Furthermore, by avoiding in particular the aforesaid problems, a not inconsiderable saving of film can be achieved. Thus, possibly a film saving in length and width of 30 mm to 40 mm or a significantly improved laminating result can be achieved, in particular with the same film material consumption.

A possible reduction in film material is explained at this point as an example with regard to the example "film saving C381", wherein hitherto a film consumption per car set was 0.918 $m^2$ but taking into account the present invention is now only 0.81 $m^2$ per car set. This results in a saving of 0.108 $m^2$ per car set, with the result that a saving of 0.84 € per car set can be achieved, taking costs for a TPO1 foam fil of 7.80 € per $m^2$ as the basis. This means an overall cost saving of 168,480.00 € per year for 200,000 vehicles.

The present effects and advantages can be achieved particularly advantageously if the thermal sub-region in particular of the first tool half has different thermal properties from the first sub-region of this tool half.

The term "thermal sub-region" describes here a sub-region of the device, in particular of the tool and preferably of the first tool half by means of which any heat dissipation from the bend-around region of the film part is significantly reduced or almost completely prevented.

Or with a corresponding configuration of the apparatus, cumulatively or alternatively even an additional heat input can be brought into the bend-around region of the film part, as will be explained further hereinafter.

The term "film part" describes in the sense of the invention any material web which can be laminated on a carrier part, whereby a previously substantially two-dimensional film part acquires a three-dimensional shape.

Usually the film part comprises a decorative layer by means of which the laminated carrier part receives a visually attractive surface side.

For this purpose, the film part is preferably provided with a pattern, a surface design, a surface texture or leather surface texture or similar whereby it obtains a good side or an A-side which forms a visually and haptically pleasant side facing away from the carrier part. The "poor side" or "B-side" is facing away from the carrier part, which means nothing other than that this side is operatively connected or adhesively bonded to the carrier part.

By this means, visually and haptically high-quality components such as, for example a vehicle interior trim part or the like can be manufactured cost-effectively.

The term "bend-around region" describes a sub-region of the film part which, starting from the laminating region, projects into a film run-out of the tool and which is therefore arranged in the edge region adjacent to the laminating region.

In other words, this means that the bend-around region in particular during the laminating process projects beyond the actual carrier part in order to be ultimately completely bent around or folded around the carrier part edge after the laminating process possibly in a bending-around device downstream of the laminating device.

Usually the bend-around region located in the film run-out is further shortened after laminating the film part, for example, by means of a stamping tool, which for this purpose can dip at least partially into a stamping groove provided on the second tool half. The remaining bend-around region which is left over is then subsequently adhesively bonded on the rear side of the carrier part.

The "bending around" should in particular be a folding over movement through 90° or through 180°, wherein other values can also be relevant in individual cases but particularly values greater than 90°.

The present tool is preferably adapted in particular to produce a motor vehicle interior trim part.

The tool comprises a first tool half and a second tool half, which are configured to be complementary to one another in such a manner that a film part can be laminated on a carrier part with the tool.

Usually the first tool half is an upper tool which is also designated as shell tool half. Frequently the first tool half comprises an "IMG shell" by means of which a surface design can be imprinted in the good side of a film part.

The second tool half accordingly comprises a lower tool which is frequently designated as positive tool half. This second tool half holds the carrier part in position with a carrier receptacle. Usually this second tool half is provided with a material recess directly adjacent to the carrier receptacle in which the bend-around region can be accommodated or drawn more deeply into the second tool half, in order to be able to make the bend-around region overlap even better with the rear edge region of the carrier part edge.

The material recess is configured, for example as a concave fillet or the like in the second tool half.

In particular, it is in the present case an in-mould graining (IMG) tool, by means of which a corresponding IMG laminating can be accomplished as it is preferred in the solution forming the basis of the invention.

The term "laminating region" describes in the sense of the invention that region of the device in which the film part is pressed onto the carrier part with the aid of the tool and thus is ultimately attached or laminated onto the carrier part. The laminating region is here mostly defined by the respective carrier part or by a relevant carrier part receptacle on the second tool half. Accordingly, the laminating region of the apparatus can vary depending on the carrier part currently to be laminated.

In contrast to this, the term "edge region" describes that region of the apparatus which adjoins the laminating region and in which the film part is partially arranged without being directly attached to the carrier part. More than that, this edge region forms a film run-out region of the tool for forming a bend-around region of the film part which is subsequently completely bent around the carrier part edge by means of a bend-around device and "adhesively bonded" to the rear side of the carrier part.

The edge region here lies in a run-out region of the tool or is formed on the present apparatus by a corresponding run-out region in which the film part extends mostly with its bend-around region.

Conceptually it should also be mentioned at this point that within the framework of the present invention, indefinite articles and indefinite numerical information such as "one . . . ", "two . . . " etc. should usually be understood as minimum details, i.e. as "at least one . . . ", "at least two . . . " etc. insofar as it is not deduced from the context or the specific text of a particular passage that there should be meant only "precisely one . . . ", "precisely two . . . " etc.

In general it can be stated that according to the first aspect of the present invention, thermally differently acting sub-regions are provided, in order to be able to temperature-control the film part in the edge region adjacent to the laminating region differently from in the laminating region.

The object of the invention is solved according to a further aspect of the invention by an apparatus for laminating a film part, in particular a decorative layer, on a carrier part having a laminating region, in which the film part can be laminated onto the carrier part, in particular onto a motor vehicle interior trim part, having an edge region arranged adjacent to this laminating region in which the film part projects beyond the carrier part in order to produce a bend-around region on the film part which can subsequently be bent around a carrier part edge, and having a tool in which the tool comprises a first tool half for producing a surface design on the film part and a second tool half for receiving the carrier part, wherein the apparatus is characterized by means for producing at least two different temperature regions on the film part.

With the aid of the means for producing at least two different temperature regions on the film part, namely a first temperature region in the laminating region and a different further temperature region in the edge region, it is in particular possible to temperature-control the bend-around region differently in comparison to the edge region of the film part located in the tool.

The effects and advantages hereby achieved have already been explained in detail with regard to the first aspect of the invention and they also apply to the further second aspect of the invention. In this respect, reference is made to the preceding explanations in order to avoid repetitions.

The means for producing can be most differently configured here.

Advantageously, the means for producing comprise at least one thermal sub-region which comprises a different material from the first tool half. In this case, passively acting means for producing are involved.

For example, thermally inferior-conducting elements or the like can be used on the tool in order to provide at least partially a correspondingly active material on the apparatus. By this means a reduction in contact area with thermally better conducting material can be achieved.

The present means for producing can, for example also be implemented by a suitable coating on the tool.

Generally a thermal sub-region can be formed or implemented at least in part merely by the designs mentioned only as examples.

One embodiment provides that the means for producing comprise a heating device by means of which the film part can be temperature-controlled differently in certain areas. In this case, actively acting means for producing are involved.

Thus, an actively controllable or regulatable thermal sub-region can be provided which not only uses the already existing process thermal energy but furthermore can introduce even further thermal energy additionally into the device, in particular into the edge region or into a process for laminating a film part on a carrier part.

In this respect, it is particularly advantageous if the means for producing comprise a heating device by means of which at least the first tool half can be temperature-controlled differently in certain areas.

According to a second aspect of the present invention, cumulatively or alternatively means for producing at least two different temperature regions on the film part are now provided, in order to be able to temperature-control the film part in the edge region adjacent to the laminating region differently than in the laminating region.

The present object is also solved according to another aspect of the invention by an apparatus for laminating a film part, in particular a decorative layer, on a carrier part having a laminating region in which the film part can be laminated onto the carrier part, in particular onto a motor vehicle interior trim part, having an edge region arranged adjacent to this laminating region in which the film part projects beyond the carrier part in order to produce a bend-around region on the film part which can subsequently be bent around a carrier part edge, and having a tool in which the tool comprises a first tool half for producing a surface design on the film part and a second tool half for receiving the carrier part, wherein the apparatus is characterized by an additional tool part which can be arranged at least partially in the edge region adjacent to the laminating region.

As a result of the additional tool part, advantageously the bend-around region of the film part can especially be treated thermally differently from the remaining region of the film part, wherein the effects and advantages explained with reference to the first aspect can also be achieved. In this respect, with regard to the other third aspect, reference is made to the preceding explanations in order to avoid repetitions.

It is possible that the additional tool part is an integral structural component of the first tool part half or is arranged as an independent tool part next to the first tool half.

In order to interact well with the bend-around region of the film part and thereby to be able to achieve the desired effects, it is expedient if the additional tool part can be arranged opposite the edge region arranged adjacent to the laminating region.

The additional tool part can be provided structurally particularly simply and cost-effectively if the additional tool part comprises a material which differs from the material of the first tool half and/or the second tool half.

For example, the material comprising the additional tool part has thermally inferior conducting properties. Here, it is also noted that the additional tool part can completely or partially consist of thermally inferior conducting material or can also be coated by such a material only in part.

Cumulatively or alternatively it is advantageous if the additional tool part can be moved independently with respect to the first and/or the second tool half. By means of such an independent movement, the additional tool part can, for example, come into operative contact with the bend-around region of the film part in a time-delayed manner intensively or less intensively, whereby a time interval in which a critical heat dissipation can occur at all can be varied.

The additional tool part can also be designed or used as a thermal sub-region in the sense of the invention, in order to be able to temperature-control the film part in the edge region adjacent to the laminating region differently from that in the laminating region.

In this respect, according to the third aspect of the present invention, cumulatively or alternatively an additional tool part can be provided to the already existing two tool halves in order to be able to temperature-control a film run-out region of a laminating tool and therefore also the film part in the edge region adjacent to the laminating region differently from that in the laminating region.

Furthermore it is advantageous if the tool comprises a thermal sub-region which consists of more than 30% or more than 50%, preferably more than 90% of a thermal material than preferably other sections of the first tool half. By this means corresponding areas can be formed on the tool for thermal treatment of the film part in a structurally simple and therefore also particularly cost-effective manner with the desired thermal properties.

In this context, it is already sufficient if the first tool half comprises a thermal sub-region which consists of more than 30% or more than 50%, preferably more than 90% of a thermal material than preferably the first tool half.

The expression "thermal material" describes in the sense of the invention a material which has poorer thermal conducting properties or conversely better thermal insulating properties at least compared with the tool material in the laminating region.

A coating of the material at the necessary locations or areas possibly differs from this so that according to another embodiment, it can be advantageous if the tool, in particular the first tool half, comprises a thermal sub-region which consists of less than 30% or less than 10%, preferably less than 5% of a thermal material than preferably other sections of the first tool half.

In this respect, it is particularly advantageous with respect to the prior art if the tool, in particular the first tool half comprises a correspondingly suitably configured thermal insulator.

By means of this thermal insulator, it is possible to treat the film part thermally differently in the sense of the invention not only constructively but also simply in terms of process technology.

Especially the edge region adjacent to the laminating region can be thermally insulated more effectively here so that the desired thermal effects on the bend-around region of the film part can be achieved with simple means.

The presently desired thermal effect on the bend-around region can be implemented very specifically if a thermal sub-region, means for producing at least two different temperature regions of the tool and/or an additional tool part are arranged opposite a stamping groove formed by the second tool half and/or on A-side of the stamping groove facing away from the laminating region.

It has been shown that it is sufficient if the thermally acting device with regard to the bend-around region, such as in particular the thermal sub-region, the means for producing at least two different temperature regions of the tool and/or the additional tool part but also a thermal insulator, are arranged above a stamping groove of the second tool half, in order to be able to temperature-control the film part in the edge region adjacent to the laminating region in the sense of the invention differently from in the laminating region.

It is often sufficient if such thermally acting devices are only set up from the cut or from the stamping groove, i.e. viewed in the direction of A-side of the stamping groove facing away from the laminating region.

In this respect, the thermally acting devices with respect to the bend-around region, such as in particular the thermal sub-region, means for producing at least two different temperature regions of the tool and/or the additional tool part, but also a thermal insulator are placed in the film run-out region of the tool, in particular in the first tool half.

In general, the material recess or the undercut can be provided here especially by at least three variants. Firstly the material recess can be arranged with respect to the laminating region in such a manner that the rear edge of the carrier part is arranged freely with an only small undercut. Secondly, a standard contour with necessary undercut can be used for the rear edge laminating. And thirdly no undercut for defined front-edge laminating.

In all three regions the film part or its bend-around region is drawn completely onto the corresponding contour of the material recess. Likewise into the standard contour with regard to which a rear edge laminating was accomplished on the carrier part, which results in the desired advantages with regard to the bend-around device.

In any case, by means of the solutions proposed here the elastoplastic deforming behaviour of the film part in the bend-around region can be significantly improved.

In the present case, a suction of the bend-around region onto the second tool half can take place substantially more intensely since the bend-around region is more easily deformable, the higher its intrinsic temperature is. The object is solved according to a fourth aspect of the invention by an apparatus for laminating a film part, in particular a decorative layer, on a carrier part having a laminating region in which the film part can be laminated onto the carrier part, in particular onto a motor vehicle interior trim part, having an edge region arranged adjacent to this laminating region in which the film part projects beyond the carrier part in order to produce a bend-around region on the film part which can subsequently be bent around a carrier part edge, and having a tool wherein the tool comprises a first tool half for producing a surface design on the film part and a second tool half for receiving the carrier part, wherein a material recess for deflecting the bend-around region of the film part is arranged on the first tool half outside the laminating region, by means of which a material reservoir for holding in readiness an additional length can be produced on the bend-around region.

With such a material recess, a significant stress reduction at the bend-around region can be achieved when sucking the film part onto the second tool half, so that the bend-around region can be laminated more effectively onto the carrier part edge, as already explained.

Advantageously the first tool half has a device for temporarily interposing an additional material section of the bend-around region of the film part. Merely by this means generic conventional tools are already crucially further developed.

The material recess can in particular be formed as an undercut in the form of a fillet on the first tool half.

The advantageous material recess can be provided cumulatively with the result that the bend-around region can be drawn more easily into the material recess provided on the second tool half.

As a result of this material recess, the use of thermal insulators can also be severely reduced or even be completely superfluous.

The object of the invention is further solved by an installation for producing a component laminated with a film part, in particular with a decorative layer, in particular a motor vehicle interior trim part, comprising an apparatus for laminating the film part on a carrier part, and comprising an apparatus for bending round a bend-around region of the film part which projects radially beyond a carrier part edge, wherein the installation is characterized in that the installation comprises an apparatus having at least one of the features explained here.

If the installation comprises an apparatus for laminating the film part on the carrier part in the sense of the invention, the laminated part can be completed more simply by means of the downstream bend-around device. More accurately, the more precise the bend-around region of the film part was applied to the carrier part edge, in particular to the rear edge of the carrier part edge by means of the laminating device, the more precisely a final bending of the bend-around region, in particular around the rear edge region of the carrier part edge, is also achieved.

The object of the invention is solved as well by a method for laminating a film part, in particular a decorative layer, on a carrier part by means of a tool comprising a first and second tool half in which the film part in the tool can be provided with a surface design, in which the film part is laminated onto the carrier part in a laminating region, and in which a bend-around region is produced on the film part in an edge region arranged adjacent to this laminating region, which bend-around region can subsequently be bent around a carrier part edge, wherein the method is characterized in that the laminating region and the edge region are treated thermally differently.

By means of this proposed process solution, the bend-around region of the film part located substantially in the edge region and the remainder of the film part located substantially in the laminating region can be thermally treated differently so that especially during the laminating a temperature advantageous for the bend-around region can be set in the edge region, which differs from the temperature in the laminating region, in particular is higher.

In this respect, it is possible in the present case to treat the bend-around region of the film part quite specifically thermally differently from the remainder of the film part.

Thus, in the present case the risk of the bend-around region cooling down critically can be reduced or ideally even completely prevented.

The object of the invention is solved cumulatively or alternatively also by a method for laminating a film part, in particular a decorative layer, on a carrier part by means of a tool comprising a first and second tool half, in which the film part in the tool can be provided with a surface design, in which the film part is laminated onto the carrier part in a laminating region, and in which a bend-around region is produced on the film part in an edge region arranged adjacent to this laminating region, which bend-around region can subsequently be bent around a carrier part edge, wherein the method is characterized in that in the edge region an additional tool part is brought into active contact with the film part, in order to treat the film part in the edge region thermally differently than in the laminating region.

In this further proposed process solution, an additional tool part is used in order to be able to thermally advantageously manipulate the bend-around region of the film part.

Advantageously by this means a thermal insulator can be placed very simply in the edge region in terms of process technology.

Here it is additionally feasible that the first tool half and the additional tool part are brought into operative communication with the film part or with the bend-around region of the film part in a time-delayed manner, in order to prevent the bend-around region from cooling down so that in the present case the elastoplastic deformation behaviour of the film part in the bend-around region can be substantially improved.

This is inter alia due to the fact that a suction of the bend-around region onto the second tool half can take place substantially more intensively since the bend-around region is more easily deformable, the higher its intrinsic temperature is.

The object of the invention is solved cumulatively or alternatively by a method for laminating a film part, in particular a decorative layer, on a carrier part by means of a tool comprising a first and second tool half in which the film part in the tool can be provided with a surface design, in which the film part is laminated onto the carrier part in a laminating region and in which a bend-around region is produced on the film part in an edge region arranged adjacent to this laminating region, which bend-around region can subsequently be bent around a carrier part edge, wherein the method is characterized in that the bend-around region of the film part is moved at least partially into an additional material recess, in order to produce a longer bending of the bend-around region in the edge region arranged adjacent to the laminating region so that during the laminating process of the film part on the carrier part the bend-around region can be introduced into a material recess of the second tool half with a lower tension.

Cumulatively or alternatively a likewise improved rear edge lamination can be achieved thereby by means of which on the one hand the risk of defects on the lamination can be avoided, and on the other hand an operationally reliable bending of the bend-around region around the carrier part region can be made easier in a downstream bend-around method.

It is understood that the effects and advantages already put forward at a different point can also be achieved by this process solution and these will not be explained again here to avoid repetitions.

The object of the invention is furthermore solved by a method for laminating a carrier part with a film part, in particular a decorative layer, in a tool comprising a first tool half and comprising a second tool half, in particular for producing a motor vehicle interior trim part, wherein the decorative layer in the tool can be provided with a surface design, in particular with a surface texture, wherein the decorative layer completely covers a laminating region on the carrier part and forms a bend-around region or a run-out, in particular a film run-out, running out over a marginal edge of the laminating region, wherein a third tool part is used and specifically an adapter part, in particular made of a different material compared to the first tool half, wherein the film run-out is laid at least partially on the adapter part.

By means of the adapter part in particular a different temperature control of the film run-out or the bend-around region of the film part can be achieved.

The marginal edge of the laminating region can be determined by the transition between laminating region and edge region. In any case, the marginal edge can be identified by means of a stamping groove arranged on the tool, in particular on the second tool half.

If the film part, in particular the bend-around region of the film part undergoes a stretching lengthening in an edge region arranged adjacent to the laminating region, the film part can be sucked with its bend-around region onto the second tool half free from tension and ultimately laminated more completely onto the carrier part edge.

Such a stretching lengthening or lengthening of an unwinding of the bend-around region of the film part can be achieved simply if the film part is sucked into a material recess arranged next to the laminating region into the first tool half in order to produce a material reservoir on the bend-around region so that the bend-around region can then again be sucked more easily into a material recess of the second tool half.

A generally preferred variant of the method provides that the film part cools more slowly in an edge region arranged adjacent to the laminating region than in the laminating region. As a result, more thermal energy than previously possible is retained in the bend-around region of the film part.

Overall in the present case the bend-around region can be sucked onto the second tool half with a lower intrinsic stiffness and therefore more pliably so that in particular a substantially better rear edge lamination can be ensured.

In the present case, the film part is therefore intentionally or specifically kept warmer in the bend-around region than in the remaining regions of the film part.

A further general variant of the method provides that the film part is additionally heated in an edge region arranged adjacent to the laminating region. Herewith a desired temperature is even more determined adjustable in the bend-around region of the film part.

Furthermore, the risk of an undesired cooling of the bend-around region of the film part can be further reduced if an edge region of the first tool half arranged adjacent to the laminating region, in particular the shell tool half, is kept free from film deposition.

If an edge region of the second tool half arranged adjacent to the laminating region, in particular the positive tool half, is kept free from film deposition, this can bring about the same effect.

The object of the invention is solved according to an additional aspect of the invention by a method for retrofitting a tool for laminating a carrier part with a film part, in particular with a decorative layer, in a tool with an existing shell tool half and an existing positive tool half, wherein the one existing tool half, particularly the existing shell tool half is exchanged for a new existing shell tool half having a thermal sub-region and/or an adapter part.

By this means, already existing devices for laminating a film part, in particular a decorative layer, on a carrier part or installations for producing a component laminated with a film part, in particular with a decorative layer, in particular a motor vehicle interior trim part, can be retrofitted conceivably simply and very cost-effectively.

With the present invention, it is in particular achieved that a film part or the like in a run-out region of the apparatus or the tool in which the bend-around region of the film part lies, does not cool down too severely or less severely especially in relation to the remaining region of the film part.

By this means an improvement in the laminating result can be achieved such as possibly the avoidance of folds or similar.

Furthermore, a lower energy loss of the film part is achieved, in particular in the thermal sub-region or in the region of the additional tool part or insert part.

Advantageously in the present case, a very good edge lamination of the carrier part edge is possible, in particular an operationally reliable rear edge lamination.

Especially an improvement or facilitation is achieved for the bending of the bend-around region around the carrier part edge.

In particular, through the provision of a thermal insulator on the first tool half, a lower weight can be achieved, which generally makes it easier to handle the tool, in particular a relevant IMG shell or a Galvano-shell.

It is understood that the modifications explained more specifically hereinbefore are not definitive so that the film run-out of the two tool halves can be configured alternatively in the sense of the invention in order to be able to achieve the effects and advantages explained here.

With the present invention, in particular an IMG laminating method can be advantageously further developed in which a surface design, in particular a surface texture or the like, is imprinted on a film part to be laminated onto a carrier part, wherein for this purpose the film part is sucked by means of vacuum towards a first tool half of a laminating tool comprising two tool halves. The two tool halves are then closed whereby the film part is thereby laminated on a carrier part held by the second tool half and wherein a bend-around region of the film part is produced in the film run-out of the laminating tool. In this case, the vacuum on the side of the first tool half is deactivated. For laminating the film part, on the one hand use is made of the pressure force with which the two tool halves are pressed towards one another during laminating. On the other hand, in particular the bend-around region of the film part sucked by means of a vacuum produced on the second tool half in order to be able to better laminate the bend-around region onto a carrier part edge.

It is understood that the features of the solutions described previously or in the claims can optionally also be combined in order to be able to implement the presently attainable advantages and effects accordingly cumulatively.

The proposed methods can in particular be carried out easily using the apparatus disclosed here.

In particular, these methods are especially suitable for an improved rear edge lamination so that these can also comprise methods for rear edge lamination of a carrier part edge of a carrier part on which a film part is laminated.

In addition, further features, effects and advantages of the present invention are explained by means of appended drawings and the following description in which as an example different tools of an apparatus for laminating a film part, in particular a decorative layer, on a carrier part are shown and described.

Components which agree at least substantially with regard to their function in the individual figures can hereby be characterized by the same reference numbers, wherein the components need not be numbered and explained in all the figures.

Figure 1:
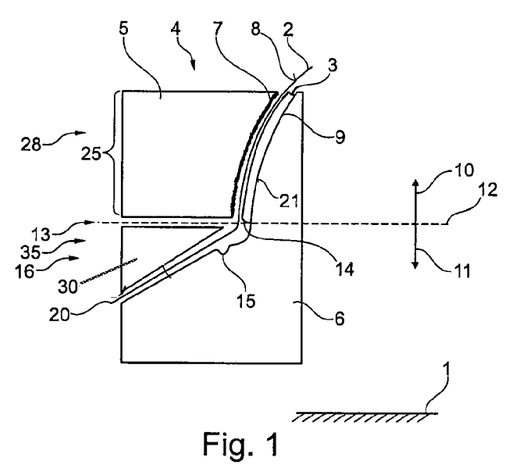
FIG. 1 shows schematically a cutaway partial view of an apparatus for laminating a film part, in particular a decorative layer, on a carrier part comprising a tool with two tool halves for laminating and an additional tool part for additional thermal treatment of a bend-around region of the film part.

The apparatus 1 shown only approximately in FIG. 1 for laminating a film part 2 on a carrier part 3 comprises a tool 4, which comprises a first tool half 5, a so-called shell tool half (not numbered separately) and a second tool half 6, often also designated as positive tool half (also not numbered separately).

The film part 2 can in particular form a decorative layer (not additionally numbered).

In particular, an IMG method can be carried out by means of the apparatus 1.

Preferably the film part 2 is preheated for this.

The apparatus 1 is a first work station of several work stations of an installation not shown here for producing a component laminated with the film part 2 (carrier part 3 plus film part 2) which in particular can be a motor vehicle interior trim part.

The first tool half 5 comprises in this first exemplary embodiment a contour 7 by means of which a surface design (not shown) can be imprinted on the good side 8 of the film part 2. For this purpose the film part 2 is sucked by vacuum in a known manner onto the first tool half 5.

The second tool half 6 comprises a carrier part receptacle 9 by means of which the carrier part 3 can be held on the second tool half 6.

For laminating the film part 2 on the carrier part 3, the two tool halves 5 and 6 are pressed onto one another, the vacuum produced on the side of the first tool half 5 is deactivated and a vacuum initiated in the side of the second tool half 6.

The apparatus 1 is further characterized by a laminating region 10 and an edge region 11 adjacent to the laminating region 10.

The laminating region 10 is substantially defined by the carrier part receptacle 9 or the carrier part 3 to be laminated on the second tool half 6.

The laminating region 10 is further characterized in that in this laminating region 10 the film part 2 is brought to overlap with the carrier part 3.

The edge region 11 is arranged laterally adjacent to the laminating region 10.

The edge region 11 directly adjoins the carrier part receptacle 9 or the carrier part 3 to be laminated.

In this exemplary embodiment, the laminating region 10 and the edge region 11 have a common boundary line 12 which in this respect lies in a transition region 13 between the laminating region 10 and the edge region 11.

The carrier part 3 ends with its carrier part edge 14 in the transition region 13.

The edge region 11 in this respect also begins next to the carrier part edge 14.

Also located in the edge region 11 is a stamping groove 15 which is formed on the second tool half 6.

The edge region 11 additionally forms a film run-out 16 which is formed substantially by the tool 4.

Figure 2:
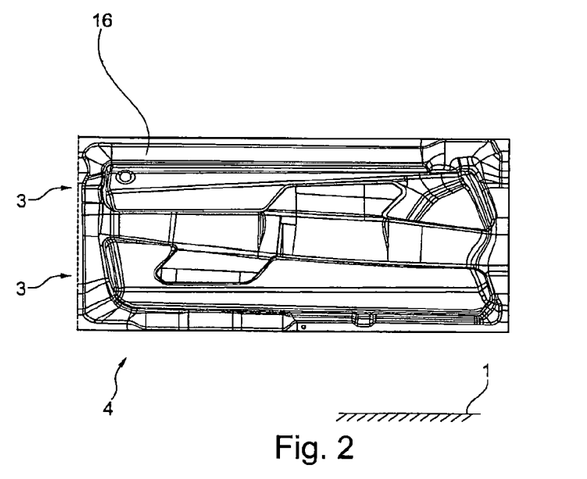
FIG. 2 shows schematically a view of the first tool half from FIG. 1 with a film run-out for producing the bend-around region of the film part.

According to the diagram according to FIG. 2, the film run-out 16 of the apparatus 1 is clearly visible in which the film part 2 or its bend-around region 20 should not be too severely cooled down. This film run-out 16 encloses two carrier parts 3 at the same time in the tool 4 shown partially in FIG. 1.

In this film run-out 16 the film part 2 extends with its bend-around region 20 which is subsequently bent around the carrier part edge 14 with the aid of a bend-around device not shown here, wherein the bend-around region 20 is then operatively connected to the rear side 21 of the carrier part 3, whereby the laminating process is substantially terminated.

Before bending around, the bend-around region 20 is however cut to size by introducing a stamping tool (not shown) into the stamping groove 15.

The bend-around region 20 designates in the sense of the invention that region of the film part 2 which projects laterally beyond the carrier part 3 and thereby projects into the edge region 11 adjacent to the laminating region 10.

In this respect, the bend-around region 20 is produced depending on the tool design on the film part 2 in the tool 4.

If the film part 2 in particular comes into operative contact with the first tool half 5, for example, during imprinting of the surface contour onto the good side 8 of the film part 2, the previously pre-heated film part 2 cools down, with the result that its intrinsic stiffness increases again.

This is usually not a problem for the flat lamination of the film part 2 on the carrier part 3, but frequently is for the complete lamination of the bend-around region 20 onto the carrier part edge 14.

This is especially because an intrinsically stiffer bend-around region 20 nestles less pliably against the second tool half 6 and in particular less pliably against the carrier part edge 14.

In order to avoid a critical cooling of the bend-around region 20 as far as possible, the first tool half 5 comprises thermally differently acting sub-region 25, namely a first sub-region 25 with the contour 7 for the surface design, which interacts with the laminating region 10, and a thermal sub-region which interacts with the edge region 11 adjacent to the laminating region 10.

The thermal sub-region is thereby implemented as a thermal insulator or a thermal material made of plastic.

It is understood that for this purpose however other materials such as possibly ceramic or less strongly conducting NE metals or the like can be considered.

In this respect, the tool 4 comprises with respect to the first tool half a thermal sub-region of a thermal material which differs in terms of its thermal insulator properties from other sections 28 of the first tool half.

In this first exemplary embodiment the thermal sub-region is provided by an additional tool part 30.

The additional tool part 30 is here arranged as an independent tool part in the edge region 11 adjacent to the laminating region 10.

Optionally the additional tool part 30 can be moved independently of the two tool halves 5 and 6 towards the bend-around region 20 so that it can be brought into operative contact with the film part 2 in a time-delayed manner with regard to the first tool half 5, in order to hereby reduce a heat dissipation from the bend-around region 20.

In any case, the laminating region 10 and the edge region 11 can be treated thermally differently, due to the thermally differently acting sub-regions 25.

Furthermore the apparatus 1, according to the first exemplary embodiment shown in FIGS. 1 and 2, is also characterized by means 35 for producing at least two different temperature regions on the film part 2.

The means 35 for producing at least two different temperature regions here embody the thermal sub-region with the thermal material.

The additional tool part 30 also provides means 35 in the sense of the invention for producing at least two different temperature regions, wherein these means 35 can alternatively or cumulatively to the thermal material comprise a heating device (not shown), in order to be able to treat the edge region 11 of the apparatus or the tool 4 and the bend-around region 20 of the film part 2 thermally differently.

Figure 3:
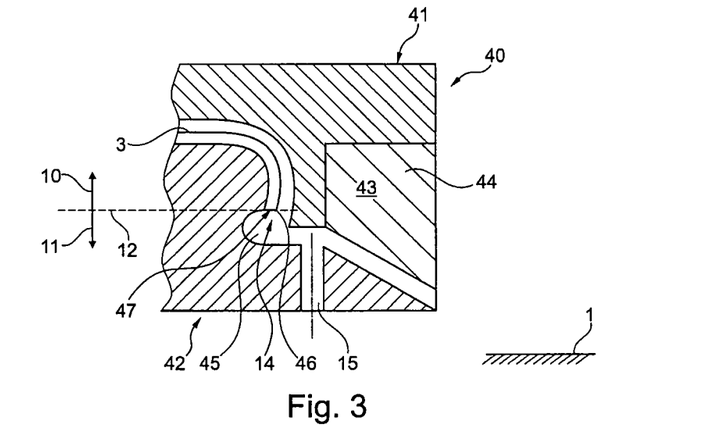
FIG. 3 shows schematically a sectional view of another tool for use in the apparatus with a thermal insert inserted in the first tool half.

A second exemplary embodiment is shown according to the diagram according to FIG. 3.

FIG. 3 shows an alternative tool 40 comprising a first tool half 41 and a second tool half 42 in use in the apparatus 1 in which a different thermal sub-region 43 is integrated as integral structural component 44 in the first tool half 41, i.e. the shell tool half, in order to treat the film part 2 in the edge region 11 thermally differently from in the laminating region 10.

The other thermal sub-region 43 begins here after the stamping groove 14 on the side of the stamping groove 15 facing away from the laminating region 10.

If less thermal energy is withdrawn from the bend-around region 20 of the film part 2, in the sense of the invention, for example, as a result of the thermally better insulating thermal sub-region 43, the bend-around region 20 remains formable and it can more easily be brought or drawn into a material recess 45 of the second tool half 42, possibly by means of negative pressure on the second tool half 42.

As a result, not only a good lamination of the front edge 46 of the carrier part edge 14 of the carrier part 3 is achieved but furthermore also an extraordinarily good and more intensive lamination of the rear edge 47 of the carrier part edge 14.

The material recess 45 is here formed as an undercut in the shape of a concave fillet.

Figure 4:
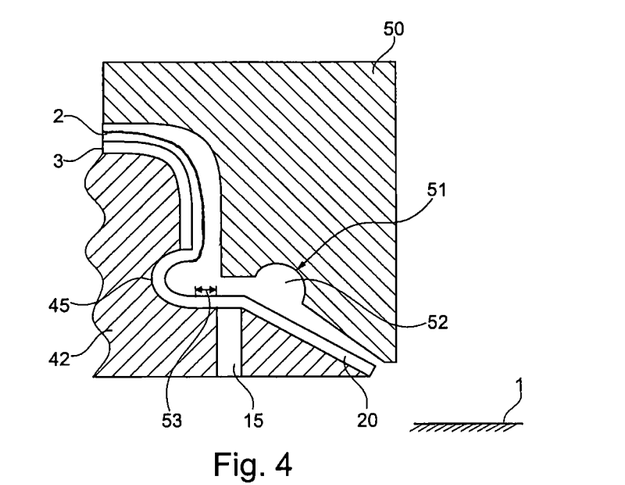
FIG. 4 shows schematically an alternative tool for use in the apparatus with a concave fillet incorporated in the first tool half as a material recess.

Another exemplary embodiment is shown according to the diagram in FIG. 4, which approximately corresponds to the second exemplary embodiment, apart from an exchanged first tool half 50.

The exchanged first tool half 50 has a material recess 51 for deflecting the bend-around region 20 of the film part 2 by means of which a material reservoir 52 is produced for holding in readiness an additional length or stretch lengthening 53 on the bend-around region 20.

The material recess 51 enables a longer unwinding (not explicitly numbered) of the bend-around region 20 in the edge region 11 adjacent to the laminating region 10 so that the bend-around region 20 can be introduced or drawn into a material recess 45 of the second tool half 42 with a substantially lower tension during the laminating process of the film part 2 on the carrier part 3.

The material recess 51 is arranged outside the laminating region 10.

At this point it should be explicitly pointed out that the features of the solutions described hereinbefore or in the claims and/or figures can optionally also be combined, in order to be able to implement or achieve the explained features, effects and advantages correspondingly cumulatively.

It is understood that the previously explained exemplary embodiments are merely first embodiment of the apparatus 1 according to the invention. In this respect, the embodiment of the invention is not restricted to these exemplary embodiments.

All the features disclosed in the application documents are claimed as essential to the invention if they are new individually or in combination with respect to the prior art.

REFERENCE LIST

1 Apparatus for laminating a film part on a carrier part
2 Film part
3 Carrier part
4 Tool
5 First tool half or shell tool half or IMG shell
6 Second tool half or positive tool half
7 Contour
8 Good side
9 Carrier part receptacle
10 Laminating region
11 Edge region adjacent to laminating region
12 Common boundary line
13 Transition region
14 Carrier part edge
15 Stamping groove
16 Film run-out
20 Bend-around region
21 Rear side
25 First sub-region or first temperature region
28 Other sections
30 Additional third tool part or adapter part
35 Means for producing two different temperature regions
40 Alternative tool
41 First tool half or shell tool half or IMG shell
42 Second tool half or positive tool half
43 Different thermal sub-region
44 Integral structural component 45 Material recess
46 Front edge
47 Rear edge
50 Exchanged first tool half
51 Material recess
52 Material reservoir
53 Stretch lengthening

The invention claimed is:

1. An apparatus for laminating a film part on a carrier part having a laminating region in which the film part can be laminated onto the carrier part having an edge region arranged adjacent to this laminating region in which the film part projects beyond the carrier part in order to produce a bend-around region on the film part which can subsequently be bent around a carrier part edge, and having a tool in which the tool comprises a first tool half for producing a surface design on the film part and a second tool half for receiving the carrier part, characterized by means for producing at least two different temperature regions on the film part, wherein the means for producing comprise a heating device by means of which at least the first tool half can be temperature-controlled differently in certain areas.

2. An installation for producing a component laminated with a film part comprising an apparatus for laminating the film part on a carrier part according to claim 1 and further comprising an apparatus for bending round a bend-around region of the film part which projects radially beyond a carrier part edge.

3. A method for laminating a film part on a carrier part by means of a tool comprising a first and second tool half in which the film part in the tool is provided with a surface design, in which the film part is laminated onto the carrier part in a laminating region and in which a bend-around region of the film part is produced in an edge region arranged adjacent to this laminating region, which bend-around region can subsequently be bent around a carrier part edge, wherein the laminating region and the edge region are treated thermally differently, and wherein the film part is sucked into a material recess arranged next to the laminating region into the first tool half, in order to produce a material reservoir on the bend-around region so that the bend-around region can then again be sucked more easily into a material recess of the second tool half.

4. The method according to claim 3, wherein the bend-around region of the film part undergoes a stretching lengthening in an edge region arranged adjacent to the laminating region.

5. A method for laminating a film part on a carrier part by means of a tool comprising a first and second tool half in which the film part in the tool is provided with a surface design, in which the film part is laminated onto the carrier part in a laminating region and in which a bend-around region of the film part is produced in an edge region arranged adjacent to the laminating region, which bend-around region can subsequently be bent around a carrier part edge, wherein the laminating region and the edge region are treated thermally differently, and wherein the film part cools more slowly in the edge region than in the laminating region.

6. The method according to claim 5, wherein the tool comprises an additional tool part arranged in the first tool half at least partially in the edge region, wherein the additional tool part is made of, or coated by, a thermal material having better thermal insulating properties compared with a first tool half material in the laminating region.

7. The method according to claim 6, wherein the thermal material is plastic or ceramic.

8. The method according to claim 6, wherein the additional tool part is an integral structural component of the first tool half or the additional tool part is arranged as an independent tool part next to the first tool half.

9. The method according to claim 6, wherein in the edge region the additional tool part is brought into effective contact with the film part, in order to treat the film part in the edge region thermally differently than in the laminating region.

10. The method according to claim 5, wherein the film part is preheated before introduction into the tool.

11. The method according to claim 5, wherein the surface design is imprinted on the film part by sucking the film part by means of vacuum towards the first tool half.

12. The method according to claim 11, wherein the first and second tool halves are closed whereby the film part is laminated on the carrier part held by the second tool half, wherein the bend-around region of the film part is produced in a film run-out of the laminating tool, wherein the vacuum on the side of the first tool half is deactivated, wherein for laminating the film part use is made of pressure force with which the first and second tool halves are pressed towards one another, while the bend-around region of the film part is sucked by means of a vacuum produced on the second tool half.

13. The method according to claim 12, wherein the bend-around region located in the film run-out is shortened after laminating the film part and a remaining bend-around region which is left over after shortening is subsequently adhesively bonded on a rear side of the carrier part.

14. The method according to claim 5, wherein the first tool half comprises a shell made of a nickel material in the laminating region.

15. The method according to claim 5, wherein the second tool half comprises a carrier receptacle for holding the carrier part in position, wherein the second tool half is provided with a material recess directly adjacent to the carrier receptacle in which the bend-around region is accommodated or drawn more deeply into the second tool half.

* * * * *